United States Patent [19]

Pasman

[11] 3,743,834
[45] July 3, 1973

[54] IR TEST OF ROTATING BANDS

[75] Inventor: Jay S. Pasman, Rockaway, N.J.

[73] Assignee: The United States of America as represented by the Secretary of the Army, Washington, D.C.

[22] Filed: Apr. 6, 1972

[21] Appl. No.: 241,719

[52] U.S. Cl. .................. 250/83.3 D, 250/83.3 H
[51] Int. Cl. .................................. G01n 25/72
[58] Field of Search ................ 250/83.3 H, 83.3 D

[56] References Cited
UNITED STATES PATENTS

| 3,020,745 | 2/1962 | Sielicki | 250/83.3 H X |
| 3,206,603 | 9/1965 | Mauro | 250/83.3 H |
| 3,413,474 | 10/1968 | Freeh | 250/83.3 H |
| 3,678,276 | 7/1972 | Lampi et al. | 250/83.3 H |

Primary Examiner—Archie R. Borchelt
Attorney—Harry M. Saragovitz, Edward J. Kelly et al.

[57] ABSTRACT

A method and apparatus for evaluating the integrity of the seating of a sintered iron rotating band on a surface of a body such as a projectile, which method is non-destructive. The method includes rotating the body while applying radiated localized heat to the body over an area encompassing the rotating band. Detecting the heat emanating from the rotating band and that surface of the body proximate thereto. Infrared scanning at a point remote from the application of the heat provides an indication of the emanating radiated energy and is dependent on the heat dissipation through the body from the surface as well as from the subject band. Where the band is improperly seated so as to form an air gap between the band and the body, the heat or energy will be conducted away from the band surface at a slower rate than from the adjoining body surface due to the insulation introduced by the air gap. Thus, these thermal differentials detected in the case of an improperly seated band are direct indications of the condition of the band seating and the differential is proportional to the magnitude of the clearance under the band.

8 Claims, 4 Drawing Figures

Patented July 3, 1973 3,743,834
2 Sheets-Sheet 1
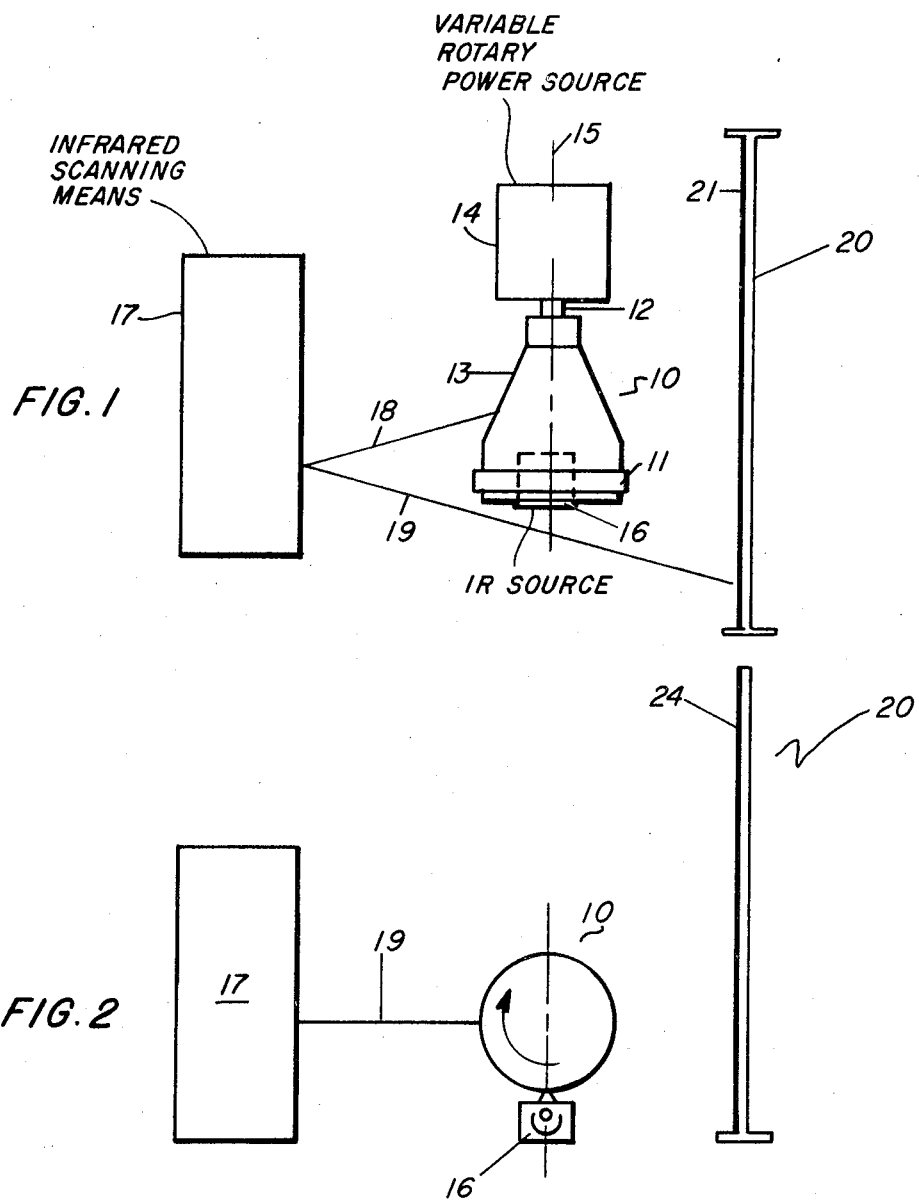

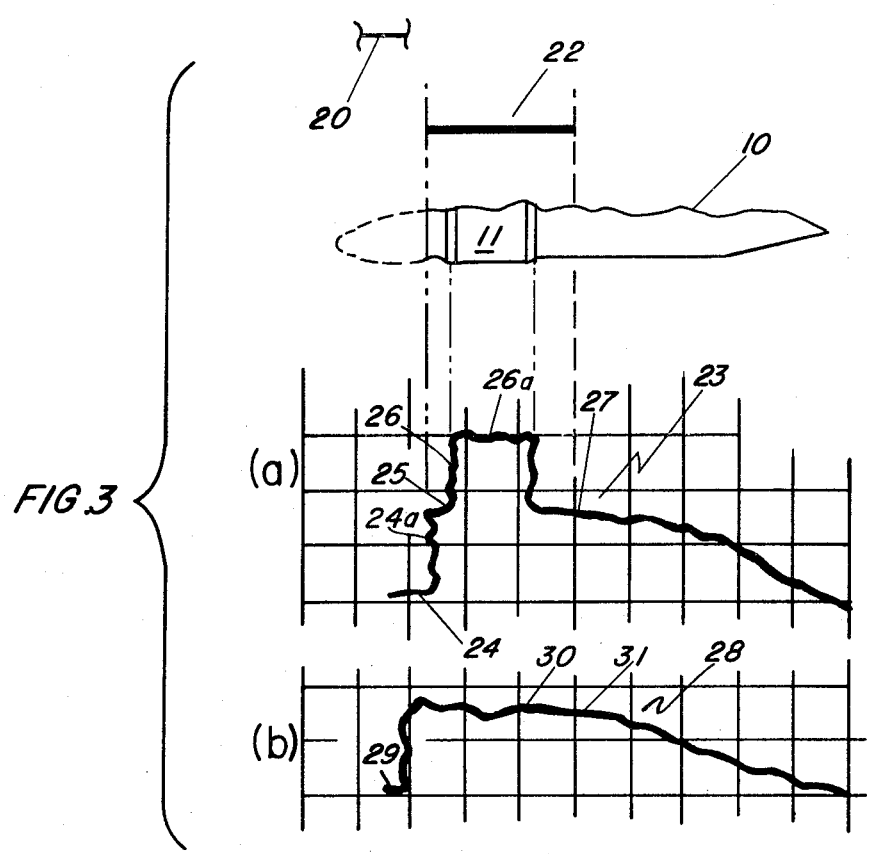
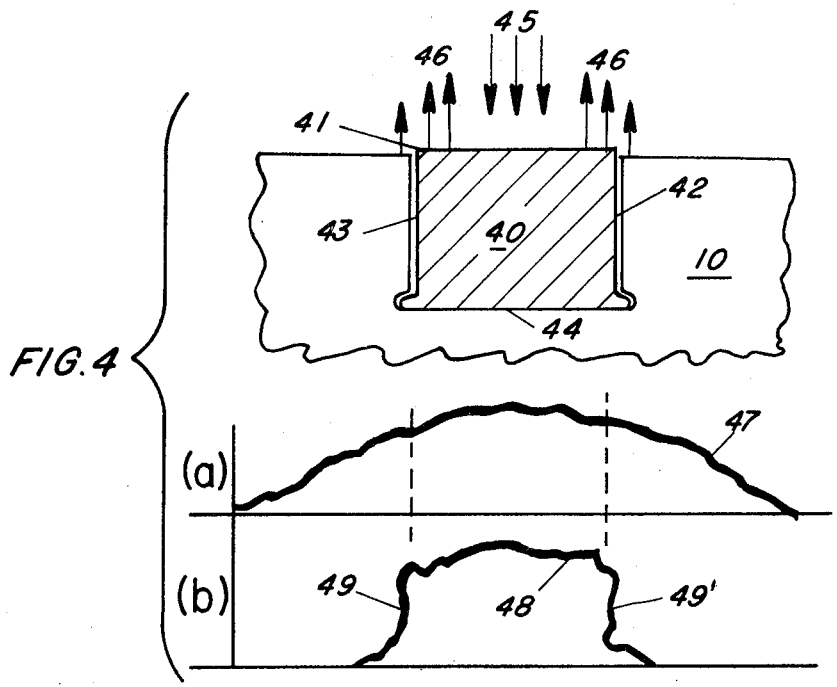

3,743,834

IR TEST OF ROTATING BANDS

The invention described herein may be manufactured, used and licensed by or for the Government for governmental purposes without the payment to me of any royalty thereon.

BACKGROUND OF THE INVENTION

The present invention relates to non-destructive testing and more particularly pertains to non-destructive evaluation of the seating characteristics of a rotating band when affixed to a projectile wherein the infrared radiation from the localized area is detected by means of an infrared detector while the projectile is slowly rotated.

In the field of testing the seating integrity of bands, it has been the general practice to employ, where non-destructivity is necessary, x-rays. The use of x-rays encompasses both large equipment and complex processing in order to properly evaluate the data obtained as well as being expensive, time consuming, and severely restricted in the size of the specimen being examined. The present method of determining the seating integrity of sintered iron rotating bands is to select a representative number of projectiles or shells and to cut sections through the band and shell in order to visually check for the occurrence of an air gap between the inner surface of the rotating band and the shell seat. In addition to limiting the number of specimens which can be tested, the sectioning operation can change the actual original existent seating condition. Since the measurement of the gap is visual, it is subject to the inherent human limitations which introduce errors as well as being excessively time consuming and costly.

For the more commonly used gilded metal (including copper) bands, the standard technique involves applying a hydraulic force to a form fitting indentor and then determining the seating deformation. The introduction of sintered iron bands has presented a problem in that the hydraulic technique can not be employed due to the fact that the compressibility characteristics of sintered iron preclude the possibility of obtaining meaningful data. Thus, for sintered iron, it is necessary to resort to a method such that pressure in the banding machine is monitored when the preformed ring is coined into the machined groove in the shell body surface. Pressure variations, however, within a multiple anvil machine tend to be erratic and are therefore only reliable to a low degree. In addition to the cost of preparing specimens and the destruction of production items, this method is not entirely satisfactory in that defective bands can escape detection. Ultrasonic inspection can not be used due to the complex contour on the inner shell surface scatters the reflected signal. X-rays on the other hand, do not provide as positive an indication as is necessary and further, the technique does not lend itself to full and complete inspection on a large production basis for most military munitions.

SUMMARY OF THE INVENTION

The general purpose of this invention is to provide a technique and apparatus for the non-destructive evaluation of projectile rotating bands that have all the advantages of similarly employed prior art devices and methods and have none of the above described disadvantages. To attain this, the present invention provides a unique non-destructive method and apparatus wherein the banded projectile body is supported for rotation about its central axis and during rotation localized heat is applied to an area of the body encompassing the band. An infrared detector is disposed to scan and sense the infrared radiated energy emanating from the localized area to which the heat had been applied. The point or area of sensing is remote from the point of application as for example, rotated at least 90°. A large flat black insulated surface is provided on the opposite side of the body and spaced therefrom so that a generally uniform background reference radiation exists. A liquid nitrogen cooled indium antimonide detector capable of single line scan provides an input for a recording system while an infrared, line type, radiant heater provides a narrow line, heat flux on the specimen over a width greater than the band and transverse thereto. With the body rotating, 360° of the heated band/body surface is scanned and recorded. The visual data is examined with regard to the background reference and the differential between the temperature of the band and the body surface proximate thereto.

An object of the present invention is to provide a method and apparatus for non-destructively testing the seating characteristics and integrity of bands applied to munition shells and the like.

Another object is the provision of a rapid, non-destructive test for sintered iron rotating bands as applied to shells which is simple, direct, inexpensive and suitable for production quantities.

Still another object is to provide a method and apparatus which is capable of providing quantitative data of the air gap intermediate a band and the seating groove in which it is positioned.

Other objects and many of the attendant advantages of the subject invention will be readily appreciated as the same becomes better understood by reference to the following detailed description when considered in connection with the accompanying drawings, wherein:

FIG. 1 is a plan view of the arrangement of components where the technique of this invention is employed;

FIG. 2 is an elevational view of the arrangement of FIG. 1;

FIG. 3 is a thermographic representation of typical temperatures obtained from both properly and improperly seated bands relative to the projectile body; and, FIG. 4 illustrates the radiated energy and the physical structure of the band and the body relative to lateral heat conduction with the resulting thermographs.

BRIEF DESCRIPTION OF A PREFERRED EMBODIMENT

In the illustrated embodiment of FIG. 1 a portion of a munitions shell 10 which is provided with a groove seated rotating band 11 is supported for rotation at one end thereof by a centrally located spindle or mandrel 12 which fits into the cavity just aft of the projectile exit cone 13. The spindle is rotated by a variable rotary power source 14 about its longitudinal axis 15. Positioned directly below the projectile 10 is a source 16 of infrared radiant energy in the form of a narrow line so as to direct concentrated line-type energy (heat flux) on the band 11 transverse thereto and the adjoining projectile body surface. The heat source is spaced from the specimen so that the specimen is at the focal plane. One such heater source found satisfactory was a Model 5215-5 Infrared Line Heater having a 500 T3/CL/HT lamp manufactured by R-I Controls, Division of Research, Inc. of Minneapolis, Minnesota used in conjunction with a type W5LMT3 VARIAC, power controller. Disposed for sensing the radiant energy emanating from the heated or irradiated localized shell body and band at some point along the rotary path of the heated portion is an infrared scanning means 17. Preferably, the infrared detector should be of the liquid nitrogen cooled indium antimonide type and include appropriate electronic circuitry, a CRT display with photo-recording capability and, where desirable, circuits to actuate audio-visual output indicators. The system capability should include single line scan of a length sufficient to cover the band and an adjacent area of an ambient temperature reference surface with a scanning rate commensurate with the response characteristics and the sample temperature differentials. The system must be able to present a clear indication of the specimen temperature differentials on and intermediate the reference surfaces. A successfully employed infrared scanning system was a Sierra Model 710B which consists of an optical head for sensing the infrared energy level in the field of view and an oscilloscope display unit used for image presentation. The sensing element is an indium antimonide photovoltaic detector cooled by liquid nitrogen. Two modes of presentation are available from the display unit and an image of each or both can be recorded on film. One mode is a television-type display that shows the relative temperature intensity over the entire surface of an object, warm areas being brighter than cooler areas. This C-scan display is generally referred to as a thermograph. The other mode is an x-y plot of relative temperature intensity along one line of interest supplied by a graphic recorder. The horizontal CRT trace represents the distance across the object at a selected location while the vertical displacement represents temperature variations, which have been calibrated for quantitative measurements. The scan width of the sensor is intermediate lines 18 and 19 which is effectively in the horizontal plane. Disposed on the side opposite the shell 10 from the sensing means 17, is an ambient temperature reference means 20 which, in the illustration, is a large flat panel constructed of a free standing material such as sheet metal (i.e., steel or aluminum) physically insulated from the support and any other adjoining elements. The forward face is coated with a flat black material 21 such as black velvet paint in order to simulate a black body low infrared reflective surface.

FIG. 3 includes typical thermographs resulting from inspection of both properly and improperly seated bands. The relative positioning of the reference panel 20, the line irradiation 22 from the infrared source 16 and the band 11 with respect to the projectile body 10 are also shown. The upper (FIG. 3a) thermograph 23, for the improperly seated band, starts at the left thereof namely, the lower portion 24 that indicates the ambient reference temperature of the panel 20. The succeeding portion 24a indicates a steep temperature differential of the body starting at a point on the surface which has been heated. The surface temperature remains relative constant over portion 25 until the linear scan reaches the band itself at which point, the surface temperature again rises over portion 26 and remains so over the band portion 26 and thereafter abruptly drops back to an intermediate body surface temperature at 27 and continues to diminish gradually towards the ambient temperature as the scan progressively proceeds away from the area of heat application. It is graphically clear, that where, as for the case of an air gap, the band is effectively, partially insulated from the body the heat thereof is unable to be readily conducted away from the surface and therefore indicates a much higher surface temperature. The lower graphic representation FIG. 3b, for a properly seated band, indicates by way of the graph 28 that the overall temperature 30 of the band and the proximate body surface is relatively uniform over a wide range region and decreases almost linearly past the point 31 of heat application. Thus, the distinction between the degree and integrity of seating of the band is readily apparent from a visual inspection of the thermograph. The traces represented in FIG. 3 were reproduced using a Model 710B Infrared Scanning System manufactured by Sierra Electronic Division, Philco Corp.

It is clear that in the foregoing description the energy incident on the localized projectile body area was diminished in reradiation due to the fact that it was radially (inwardly) conducted away from the surface since the area also covered the body as well as the band. Considering now FIG. 4 which shows the cross-sectional view of the band 40 inserted into the groove 41 in projectile body 10. If properly accomplished, the side walls 42 and 43 as well as the base 44 of band 40 will be in intimate contact with the surrounding walls of the projectile body and any heating of the band will be conducted outwardly across these surface contacts. Therefore, by irradiating only the band surface as at 45, heat or infrared energy will be reradiated, as at 46, from the band surface and adjacent body surfaces with a discontinuities in the resulting thermograph at junctions containing air gaps. In this situation it is advisable to use a point focused infrared detector in order to provide a thermograph indicative of the lateral heat flow across and outward of the band. FIG. 4a represents a typical variety of the graph 47 for a band which has been properly laterally seated, with the observation that the conduction heat flow across the contacting side walls is uniform, without any discontinuity. Contra, FIG. 4b shows that where there is an insulating air gap intermediate the sidewalls, the curve 48 will indicate a relatively constant level across the band with abrupt decreases 49 and 49' for the projectile body starting at the sidewalls 42 and 43.

Another variation of the aforedescribed process utilizes a heating element placed in the interior of the shell body (prior to its being loaded) and the scanning system still placed as before. This method would not require the shell being rotated, but would require a more sensitive detector. This variation would involve heating the shell and scanning one side of it during the transient state, with a go-no-go decision possible well before a state of equilibrium is reached. Thus, although this method would be slower, it could be incorporated into production-line station points and could be more practical in some instances.

This invention is a method of utilizing IR scanning to determine the integrity of seating of (sintered iron) rotating bands. The method described herein has been successfully demonstrated. The method developed is to apply localized heat to a shell body which is rotating, and then subject the body to infrared scanning to determine the relative rates of heat dissipation through the shell body and the band-body interface. An air gap at the band-body interface serves as an insulator, and heat will be conducted away from the surface more slowly than through adjoining solid portions of the body; the thermal differentials thus created are readily detectable with infrared scanning equipment, and the magnitude of the differential is proportional to the amount of clearance under the band. The applied heat does not exceed 10° F above ambient and the low heat requirement of this test method is significant.

It should be understood, of course, that the foregoing disclosure relates to only preferred embodiments of the invention and that numerous modifications or alterations may be made therein without departing from the spirit and the scope of the invention as set forth in the appended claims.

I claim:

1. An apparatus for non-destructively determining the integrity of an annular band mounted on the surface of a cylindrical body which comprises:
   support means for rotatably supporting said body coaxially of said band;
   heat irradiating means disposed for heating a narrow localized area transverse to said band and including at least said band; and
   infrared detection means operatively positioned for scanning an elongated transverse segment including both said band and adjacent annular portions of said body rotationally displaced from said localized area, and including means for indicating the infrared energy emanating from said band and said body portions;
   whereby said detection means will provide different values of heat radiation resulting from different amounts of heat conduction from said band to said body produced by proper and improper seating of said band.

2. The apparatus according to claim 1 wherein said localized area includes both said band and said body portions, to detect different values of heat radiation resulting from different amounts of radial heat conduction from said band to said body produced by proper and improper radial seating of said band.

3. The apparatus according to claim 1 further including a black body reference panel disposed on the side of said body opposite said detection means.

4. The apparatus according to claim 1 wherein said annular band is mounted in an annular groove in the surface of said body, and said localized area is limited to said band to detect different values of heat radiation resulting from different amounts of lateral heat conduction from said band to said body produced by proper and improper lateral seating of said band in said groove.

5. A method of non-destructively determining the seating integrity of an annular band mounted on the surface of a cylindrical body which comprises the steps of:
   supporting and rotating said body about an axis coaxial with said band;
   heat irradiating a narrow localized area transverse to said band and including at least said band; and
   scanning an elongated transverse segment, including said band and adjacent portions of said body, rotationally displaced from said localized area, for detecting and indicating different values of infrared heat radiation resulting from different amounts of heat conduction from said band to said body produced by proper and improper seating of said band.

6. The method according to claim 5, further including the steps of positioning an ambient temperature black surfaced reference panel behind said body, and scanning said panel with said segment.

7. The method according to claim 5, wherein both said band and said adjacent body portions are heat irradiated in the second step and scanned in the third step, for detecting different amounts of radial heat conduction from said band to said body.

8. The method according to claim 5, wherein said band is mounted in an annular groove in said body, and the heat irradiation of the second step is limited to said band while both said band and said body portions are scanned in the third step, for detecting different amounts of lateral heat conduction between said band and the side walls of said groove.

* * * * *